United States Patent [19]

Endo et al.

[11] Patent Number: 4,762,695
[45] Date of Patent: Aug. 9, 1988

[54] METHODS FOR PREPARING HIGH-PURITY MOLYBDENUM OR TUNGSTEN POWDER AND HIGH-PURITY OXIDES POWDER OF THE SAME

[75] Inventors: Hiroshi Endo; Shigeo Iiri; Masaru Hayashi; Tsutomu Yamashita, all of Yokohama; Satoshi Yamaguchi, Tokyo; Motoo Seimiya, Yokosuka, all of Japan

[73] Assignee: Kabushiki Kaisha Toshiba, Japan

[21] Appl. No.: 94,074

[22] Filed: Sep. 4, 1987

Related U.S. Application Data

[63] Continuation of Ser. No. 830,844, Feb. 19, 1986, abandoned.

[30] Foreign Application Priority Data

Mar. 4, 1985 [JP] Japan ................. 60-41238
Jun. 24, 1985 [JP] Japan ................. 60-136087
Sep. 4, 1985 [JP] Japan ................. 60-193814
Sep. 27, 1985 [JP] Japan ................. 60-212609

[51] Int. Cl.⁴ ............ C01G 39/02; C01G 41/02; C22B 34/34; C22B 34/36
[52] U.S. Cl. ............ 423/54; 423/DIG. 14; 75/0.5 AB; 75/101 BE; 75/101 R; 75/121; 210/688
[58] Field of Search .......... 423/54, DIG. 14; 75/0.5 AB, 101 BE, 101 R, 121; 210/688

[56] References Cited

U.S. PATENT DOCUMENTS

3,231,329  1/1966  Weiss et al. ............ 423/54
3,519,385  7/1970  Hurst et al. ............ 423/54
4,046,852  9/1977  Vertes et al. ............ 423/54
4,101,309  7/1978  Koseki et al. ............ 75/0.5 AB

FOREIGN PATENT DOCUMENTS

561559  8/1958  Canada ............ 75/0.5 AB

Primary Examiner—Robert L. Stoll
Attorney, Agent, or Firm—Foley & Lardner, Schwartz, Jeffery, Schwaab, Mack, Blumenthal & Evans

[57] ABSTRACT

High-purity molybdenum or tungsten powder can be produced by a process comprising (a) decomposing a powder or an oxide powder of molybdenum or tungsten with hydrogen peroxide water; (b) bringing the resulting aqueous solution of molybdenum or tungsten into contact with a cation exchange resin; (c) concentrating the aqueous solution; and (d) reducing a concentrated solid material. By omitting reducing step (d), one can obtain high-purity molybdenum or tungsten oxide powders. Because the Mo and W powders and $MoO_3$ and $WO_3$ powders prepared by this invention are of an extremely high purity, they are useful as materials for targets of VLSI elements.

22 Claims, 2 Drawing Sheets

METHODS FOR PREPARING HIGH-PURITY MOLYBDENUM OR TUNGSTEN POWDER AND HIGH-PURITY OXIDES POWDER OF THE SAME

This application is a continuation of application Ser. No. 830,844, filed Feb. 19, 1986, now abandoned.

BACKGROUND OF THE INVENTION

This invention relates to methods for preparing a high-purity molybdenum (Mo) or tungsten (W) powder, and a high-purity molybdenum oxide or tungsten oxide powder, and more specifically to methods for preparing an Mo powder or W powder or oxides powder thereof having an extremely high purity in which an amount of impurities are lowered to an order of ppb, with ease and at a less cost, the impurities being represented by radioactive elements such as uranium and thorium; alkali metals such as sodium and potassium; and heavy metals such as iron and nickel.

Circuit lead wires of MOS-LSI elements, above all, 256K bits or more VLSI elements are usually formed by applying a sputtering process in which targets comprising Mo or W are employed. At this time, it is an essential requirement that the targets are high in purity.

For example, if an impurity such as uranium or thorium is present in the target material, the formed VLSI elements will deteriorate in the reliability of operation owing to a bad influence of α rays. For this reason, it is necessary that a tolerance of the radioactive element is on the order of ppb. Further, since an alkali metal such as sodium or potassium easily migrates in gate insulating membranes of the elements in order to decline interfacial properties of MOS, its tolerance must be on the order of several tens of ppb. Furthermore, since a heavy metal such as iron or nickel will cause a leak phenomenon at an interfacial junction, and its tolerance is also required to be on the order of several tens of ppb.

The above-mentioned targets are usually manufactured by sintering Mo or W. Accordingly, in order to obtain the high-purity Mo or W targets containing less impurities, an Mo powder or a W powder which will be used as a raw material, needless to say, must not contain such impurities as mentioned above, and in short it must be of an extremely high purity.

The Mo powder may be generally prepared by first dissolving an Mo ore in a solution of an alkali such as caustic soda or aqueous ammonia; adding nitric acid to the resulting sodium molybdate solution or ammonium molybdate solution to form molybdic acid; dissolving this molybdic aicd in aqueous ammonia; concentrating the solution under a reduced pressure by heating in order to precipitate the crystal of a molybdic acid; and reducing the precipitated crystal with hydrogen. In like manner, the W powder can be preared by preparing a tungstic acid and then reducing it with hydrogen.

However, these methods scarcely permit removing impurities substantially and thereby lowering their concentration to the order of ppb, and in particular, the removal of radioactive elements is impractical. In an improved technique of the above-mentioned methods of heightening the purity of the product, a recrystallization process is applied to the crystal of a molybdic acid or a tungstic acid.

Even in the case of the application of this recrystallization process, however, both the molybdic acid and the tungstic acid have a peculiar property of adsorbing impurities, and thus such a manner as mentioned above is too low an impurity removal efficiency to be practiced. In addition thereto, the recrystallization process takes a long period of time to carry out a purification treatment and requires intricate extra facilities, which fact will remarkably increase the costs of the Mo powder and the W powder.

For the enhancement of the purity of target materials, a purification method (an EB melting process) has been developed in which an electron beam is applied to the sintered bodies manufactured by the Mo or W powder. According to this method, alkali metals and heavy metals can be relatively easily eliminated, but uranium and thorium are difficult to remove, because vapor pressures of uranium and thorium are close to those of Mo and W. In consequence, the EB melting process is not considered to be a satisfactory means for the high purification.

SUMMARY OF THE INVENTION

An object of the present invention is to provide a method for preparing an Mo or W powder or powder of oxides thereof having an extremely high purity at which a content of such impurities as mentioned above is on the order of ppb, and according to the present invention, the problems just described can be solved and overcome.

The method for preparing the high-purity Mo or W powder comprises a first step of decomposing a powder or an oxide powder of Mo or W with hydrogen peroxide water; a second step of contacting the resulting aqueous solution with a cation exchange resin; a third step of concentrating the aqueous solution obtained in the second step; and a fourth step of subjecting a concentrated solid material obtained in the third step to a hydrogen reduction treatment.

The method for preparing the high-purity molybdenum oxide or tungsten oxide powder comprises a first step of decomposing a powder or an oxide powder of Mo or W with hydrogen peroxide water; a second step of contacting the resulting aqueous solution with a cation exchange resin; and a third step of concentrating the aqueous solution obtained in the second step.

DESCRIPTION OF THE PREFERRED EMBODIMENTS

First of all, reference to a first step of this invention will be made. In the first step, an Mo powder, a W powder or its oxide powder which has been manufactured in a conventional manner and which thus contains much amounts of impurities is dissolved in hydrogen peroxide water in order to decompose it.

At this time, the Mo oxides and the W oxides used in this invention are not particularly limited, but lower oxides are preferable in particular in view of a reactivity with hydrogen peroxide water. Concrete examples of the lower oxides include $WO_2$, $W_4O_{11}$ and $Mo_4O_{11}$. These oxide powders may be manufactured using the conventional method, and thus contain great amounts of the impurities.

Details of the decomposition reaction at this time are not absolutely definite, but with regard to the Mo and W powders, the following reactions (1) and (2) would occur, respectively, and the impurities in the powders would be presumed to become cations.

$$2Mo + 7H_2O_2 \rightleftharpoons 2HMoO_4 + 6H_2O \quad (1)$$

$$2W + 7H_2O_2 \rightleftharpoons 2HWO_4 + 6H_2O \quad (2)$$

That is to say, it is considered that Mo and W behave as certain kinds of complex ions, and the impurities in the powders behave as cations. On the other hand, when the $WO_2$ and $Mo_4O_{11}$ powders are used, the following reactions (3) and (4) would occur, and the impurities in the powders would be presumed to become cations in like manner.

$$2WO_2 + 3H_2O_2 \rightarrow 2HWO_4 + 2H_2O \quad (3)$$

$$Mo_4O_{11} + 3H_2O_2 \rightarrow 4HMoO_4 + H_2O \quad (4)$$

In the above-mentioned formulae (3) and (4), a consumption percent of used hydrogen peroxide, i.e., molar ratios ($H_2O_2/HWO_4$ or $H_2O_2/HMoO_4$) of the used hydrogen peroxide per mole of $HMoO_4$ are 1.5 and 0.75, respectively. As described above, however, in the case that the Mo or W metal powder is used as the Mo or W material powder, the reaction would make progress in accordance with the formula (1) or (2), respectively, and thus the consumption ratio of hydrogen peroxide is 3.5. Therefore, in the decomposition reactions using oxides of the above-mentioned formulae (3) and (4), the consumption of hydrogen peroxide water is reduced remarkably, above all, in decomposition reactions of using the lower oxides, as compared with the case of using the Mo metal powder. In consequence, it is more preferred to make use of the oxide powders.

When a grain diameter of the Mo or W powder is too large, the decomposition reaction will take a long time, which fact is inconvenient in point of productivity. Inversely, when the grain diameter thereof is too small, the decomposition reaction will vigorously progress and its control will be fairly intricate, though the time necessary for the decomposition reaction will be shortened advantageously. Generally, the grain diameter of the Mo or W powder is within the range of 1 to 100 μm, preferably 1 to 30 μm, more preferably 1 to 10 μm or so.

A hydrogen peroxide concentration of used hydrogen peroxide water is preferably within the range of 5 to 35 by weight, more preferably 20 to 35% by weight. When this concentration is in excess of the level of 35% by weight, its handling will be extremely difficult; when it is less than the level of 5% by weight, a larger amount of heat energy will be necessary to vaporize water in heating and concentrating an aqueous solution (a part of a third step) obtained in a second step of this invention, which will lead to the increase in the whole cost, though the above-mentioned problems of the conventional technique will be solved It should be noted that $H_2O_2$ is a weak acid and thus is partially taken in a molybdate or a molecule (a compound) combinining with an OH group and the like. Therefore, the part of impurities will not be adsorbed by an ion exchange resin and will be eluted together with Mo or W, so that purity of Mo or W will be lowered. For this reason, the impurities may be ionized by adding a strong acid. In this case, however, if the concentration of the acid is 0.5N or more, a separation efficiency of Na, K, Mg and the like will remarkably deteriorate. In view of this fact, the concentration of the acid is preferably 0.4N or less, more preferably within the range of 0.05 to 0.2N. Usable examples of the strong acids include hydrochloric acid and nitric acid.

This first step makes progress in the state of an exothermic reaction. If a temperature in the reaction system is too high, precipitates of molybdic acid or tungstic acid will begin to be produced, which will render a purification in the subsequent steps difficult. Further, if too high, hydrogen peroxide itself will be thermally decomposed, so that the reactions of formulae (1) and (2) will not advance smoothly, which fact will brake a mass production. Accordingly, the reaction in the first step should preferably be performed while cooling. The cooling operation can be carried out so that the temperature in the reaction system may be preferably at a level of 60° C. or less, more preferably within the range of 10° to 40° C. When the Mo or W powder is brought into contact with hydrogen-peroxide water at once, a bumping phenomenon will occur. Therefore, it is preferred that hydrogen peroxide is gradually added to the Mo or W powder, while stirring all over, so as to advance the reaction slowly.

Therefore, a manufacturing device used in the first step is preferably provided with a cooling mean for cooling the above-mentioned reaction system. A such cooling constitution can be given so that an $H_2O_2$-resistant decomposition vessel made of, for example, a fluorine resin such as tetrafluoroethylene or a polyethylene may be water-cooled on its periphery. Needless to say, any cooling means is acceptable, so long as it can cool the reaction system. Further, since it is preferred to gradually add $H_2O_2$ thereto as mentioned above, an equipment for continuously adding hydrogen peroxide is preferably provided to the manufacturing device.

Figure 1:
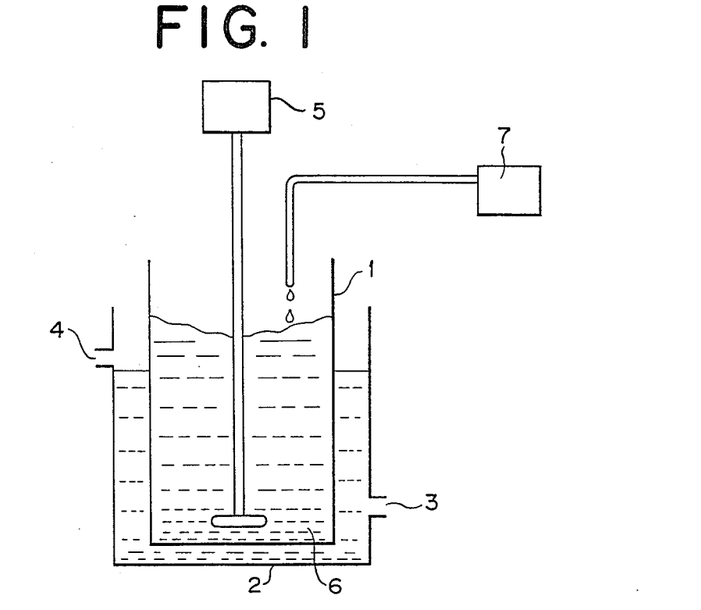
FIG. 1 is a schematic view illustrating one embodiment of a decomposition device used in a first step of this invention.

One embodiment of such a decomposition device is shown by a schematic view in FIG. 1.

Reference numeral 1 in this drawing is a decomposition vessel made of a material excellent in a resistance to $H_2O_2$ such as a tetrafluoroethylene polymer, and in the vessel 1, sample 6 of hydrogen peroxide water containing a W or Mo powder material is placed. Further, this decomposition vessel 1 is received in a cooling tank 2. In this drawing, numerals 3 and 4 are a cooling water inlet and a cooling water outlet, respectively. The sample 6 in the decomposition vessel is stirred by a stirrer 5 to accelerate and uniformize the reaction therein. In order to continuously feed $H_2O_2$ into the decomposition vessel 1, a continuously $H_2O_2$ feeding device 7 is additionally provided thereto. As the device 7, any member such as a pump may be employed, so long as it can feed $H_2O_2$ thereto at a constant flow rate.

In this way, the decomposition vessel is provided with the streaming water cooling device and is constituted so as to continuously add hydrogen peroxide thereinto, and thus the generation of a reaction heat can be controlled, with the result that the much Mo or W powder can always be decomposed at a low temperature of 60° C. or less. As a result, the decomposition and the evaporation of hydrogen peroxide and the precipitate of a molybdic acid or tungstic acid can be inhibited, by which facts the decomposition device just described can be simply constituted and the used agent ($H_2O_2$) can be saved. Therefore, the total costs of the first step can be remarkably decreased and the safety of its operation can also be improved advantageously.

Although the first step makes progress in the state of the exothermic reaction, a calorific value can be restrained to a lower level in the case that the oxide powder of Mo or W is used, because the amount of hydrogen peroxide water in the decomposition reaction is small. Therefore, the reaction will progress moderately and rapidly on the whole, which fact means that any intricate temperature control is not necessary in the reaction system.

In a second step of this invention, the aqueous solution prepared in the above-mentioned first step is brought into contact with a cation exchange resin, so that impurities which are present as cations therein will be adsorbed by the exchange resin, thereby removing the impurities from the aqueous solution. Mo or W in this step is present in the form of $MoO_4-$ or $WO_4-$, as shown in the formulae (1) to (4), and thus it will be eluted from the cation exchange resin without being adsorbed thereby. In this way, the impurities alone will be removed substantially perfectly from the Mo or W powder material by the adsorption function of the cation exchange resin in this step.

The used cation exchange resin is preferably an H type which is excellent in an elimination efficiancy of cations, and a grain diameter of the cation exchange resin depents upon factors such as an amount of the aqueous solution to be treated, a purification efficiency and a flow rate of the solution, but it is usually within the range of 100 to 30 meshes. More specifically, the preferred cation exchange resin is composed of a basic component of a copolymer of polystyrene and about 8% of divinylbenzene (DVB) and a strongly acidic sulfone group which is an exchanger. Some of such cation exchange resins are now commercially sold under trade names of Diaion SK, Amber Light (IR-120) and DOWEX 50W-8X (each trade name, produced by Mitusbishi Kasei Co., Ltd., Rohm & Haas Co., Ltd. and Dow Chemical Co., Ltd., respectively).

Figure 3:
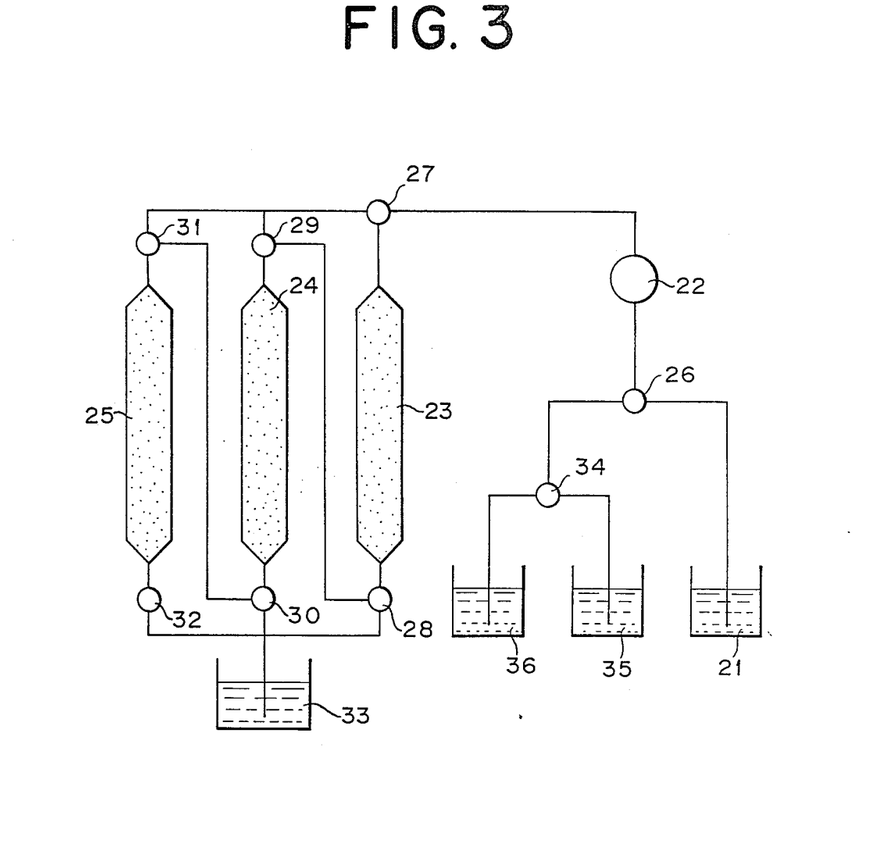
FIG. 3 is a schematic view illustrating one embodiment of a purification device used in a second step of this invention.

The contact of the cation exchange resin with the aqueous solution may be accomplished by filling columns with the cation exchange resin in a suitable density, as shown in FIG. 3, and causing the aqueous solution prepared in the first step to flow through the cation exchange resin. In this case, a multi-stage system in which a plurality of ion exchange columns are connected to each other is a preferable way from the viewpoints of a high purification and a high separation efficiency.

In a third step, the aqueous solution which has been ion-exchanged in the second step is heated to vaporize water therein and to thereby carry out its concentration.

When the aqueous solution prepared in the second step, i.e., the aqueous solution containing Mo or W alone is heated for the evaporation of water therein, a concentrated solid of $H_2MoO_4.xH_2O$ or $H_2WO_4.xH_2O$ will be obtained. This concentration treatment may be carried out usually at a temperature of 50° to 300° C., more preferably 50° to 100° C., and it is also preferred to accomplish the treatment under a reduced pressure. The heating and drying may be carried out at 100° to 300° C. Further, in this invention, a high-frequency heating and concentration treatment by the use of microwave is preferred.

In this invention, the concentration process of using the microwave may be carried out concretely by using an apparatus in which the high-frequency heating system based on the microwave is utilized, for example, a microwave oven. According to this heating system, water molecules in the Mo or W solution to be concentrated are excited so that heat is generated and a temperature of the solution is inhibited to a level of about 100° C. In consequence, a vessel for receiving the solution to be concentrated may not have a so high heat resistance. For example, the vessel made from a polyethylene, a polypropylene, Teflon (trade name, produced by E.I. du Pont de Nemours & Co. Inc.) can be utilized, and any contamination does not occur from the vessel.

In this heating concentration step, a heating time can be suitably regulated in accordance with an amount of the solution to be concentrated and the like, but the heating operation is preferably stopped just before $H_2MoO_4.xH_2O$ or $H_2WO_4.xH_2O$ precipitated on the bottom of the vessel has been evaporated to dryness, because if the water in the solution is lost absolutely, the excitation of the metal compound will be increased in order for its temperature to abruptly rise. When $H_2MoO_4.xH_2O$ or $H_2WO_4.xH_2O$ is stirred immediately before evaporated to dryness, it will be dried by thermal inertia and will easily be granulated. That is, the concentration and the drying can be carried out in one step, and in a subsequent grinding process, a lot of drive power can be saved.

For the prevention of the contamination of the solution with impurities in the above-mentioned step, a lid made from, e.g., Teflon is preferably employed for the vessel. Further, spatulas for stirring and the like which will be used after drying are preferably made from Teflon.

A concentration device used in the third step may be one which is provided with, for example, a sealed vessel for receiving the molybdenum or tungsten solution to be concentrated; a heating means disposed around the outer periphery of the sealed vessel; and a pressure-reducing means, connected with the sealed vessel, for reducing a pressure in the latter.

Figure 2:
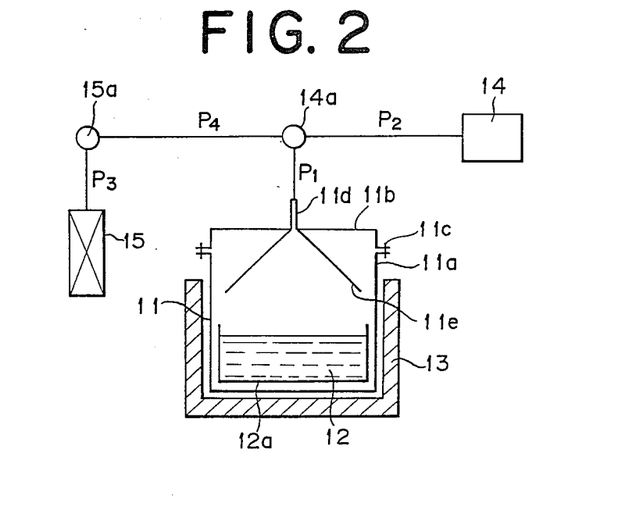
FIG. 2 is a schematic view illustrating one embodiment of a concentration device used in a third step of this invention.

Reference to the third step will be made in detail in accordance with the schematic view of FIG. 2. In this drawing, numeral 11 is a sealed vessel which is composed basically of a lower box 11a and an upper lid 11b. These members 11a and 11b are joined detachably at their flange portions 11c by means of bolts and nuts. The upper lid 11b is provided with an exhaust portion 11d connecting to the pressure-reducing means which will be described hereinafter. In this sealed vessel 11, a container 12a filled with the Mo or W solution 12 to be concentrated is received.

A heating means 13 is arranged around the outer periphery of the sealed container 11, and a preferable example of the heating means 13 is a mantle heater disposed so as to wrap the whole container 11, because the mantle heater can restrain a heat loss at the time of heating and thus can reduce an energy cost.

Reference numeral 14 is a pressure-reducing means to reduce a pressure in the sealed vessel 11, which is connected with the upper lid 11b via a conduit $P_1$, a flow path switch cock 14a and a conduit $P_2$. As the pressure-reducing means 14, a usual vacuum pump may be employed, but since water vapor and water always occur in the heating and concentration step for the solution 12 as described below, the pressure-reducing means 14 preferably has such a structure that its function is not impaired by water vapor and the like. For example, a trap may be disposed in the middle of the conduit $P_2$, or as the simplest means, an aspirator in which running water is utilized may be employed.

An air filter 15 is connected with the exhaust portion 11*d* via a conduit P₃, a cock 15*a*, a conduit P₄, a cock 14*a* and the conduit P₁. The series of members just mentioned constitutes an additional system for recovering the pressure in the vessel 11 into ordinary pressure prior to taking out the produced concentrated solid material from the sealed vessel 11, after the heating and concentration treatment under the reduced pressure has been over.

The vessel 11 surrounds the solution 12*a* and a space section thereover as shown in the drawing, and in the vessel 11, an umbrella ·11*e* connecting to the exhaust portion 11*d* is provided so as to present the contamination of the solution 12*a*, in other words, the concentrated solid material by foreign substances.

The apparatus just described can be operated as follows:

For example, the molybdenum or tungsten solution 12*a* to be concentrated is placed in the lower box 11*a*, and the upper lid 11*b* is put on the latter airtightly. Afterward, the pressure-reducing means 14 is operated to reduce the pressure in the vessel 11 and the heating means 13 is also caused to work. Under the conditions of a predetermined vacuum and temperature, the heating and concentration treatment is carried out. At the point of time when the evaporation and the removal of water in the solution 12*a* has been completed, the operation of the heating means 13 and the pressure-reducing means 14 is brought to a stop, and the cocks 14*a*, 15*a* are switched so as to allow air which has been cleaned through the air filter 15 to flow into the vessl 11. After ordinary pressure has been reached in the vessel 11, the upper lid 11*b* is detached from the box 11*a* and the concentrated solid material is then taken out therefrom.

Operating conditions such as a vacuum degree and a temperature in the vessel 11 can be decided on the basis of a kind, a concentration, an amount and the like of the solution 12*a*, but for example, it is preferred that the pressure and the temperature in the vessel 11 are from about 10 to 50 mmHg and from about 60° to 100° C., more preferably 70° to 100° C., respectively. If the aforementioned conditions are selected for the heating and concentration treatment, (1) the Mo or W solution which is being concentrated in the sealed vessel will not be contaminated by anything, (2) since the evaporation treatment is done under the reduced pressure, the concentration can be accomplished in a shorter period of time than under ordinary pressure, and (3) the temperature in the vessel at heating can be set lower than under ordinary pressure.

The present invention comprises a fourth step in which the concentrated solid material which has been prepared in the third step is reduced with hydrogen in order to obtain the high-purity Mo or W powder. When heated at a temperature of 400° to 700° C., preferably 400° to 650° C., in a hydrogen atmosphere to obtain $MoO_2$ and then further heated at a temperature of 800° to 1,100° C. in an ordinary manner, the prepared solid material will be chemically reduced to the Mo or W powder.

The present invention can be carried out, for example, as follows: A crude tungsten (or molybdenum) powder (or its oxide powder) and water are placed in a vessel equipped with a running water cooler and a stirrer. Hydrogen peroxide water is added thereto dropwise successively for decomposition, and an aqueous tungusten (or molybdenum) solution is then brought into contact with an H-type strongly acidic cation exchange resin. The impurities-free aqueous tungusten or molybdenum solution is heated and evaporated under a reduced pressure in a polypropylene sealed vessel for concentration, and is further heated and dehydrated, thereby obtaining high-purity tungusten oxide ($WO_3$) [(or high-purity molybdenum oxide ($MoO_3$)]. The thus obtained $WO_3$ (or $MoO_3$) can be used as is. The high-purity $WO_3$ (or $MoO_3$) is available for a target material or the like. At this time, a heating temperature is 50° to 795° C., preferably 100° to 795° C. Further, in order to obtain W (or Mo), the thus obtained $WO_3$ (or $MoO_3$) is then reduced with hydrogen at a temperature of 800° to 1,100° C., preferably 800° to 1,000° C. In order to obtain W (or Mo), reducing procedure is required and the dehydration temperature is sufficient at 100° to 300° C. The tungusten (or molybdenum) powder which has been prepared by such an operation has a high purity, and an amount of the used hydrogen peroxide is one-half or less of its amount in the case that cooling is not made, and it is in the vicinity of a theoretical amount. Moreover, a yield of tungsten (or molybdenum) can also be improved remarkably.

EXAMPLE 1

(1) First Step 1.0 kg of a crude Mo powder (average grain diameter 5 μm) containing impurities in amounts shown in Table 1 was placed in a vessel an inner wall of which was made of a tetrafluoroethylene polymer, and 500 ml of water was then added thereto, followed by stirring. While the vessel was cooled with running water, 4.5 liters of 30% hydrogen peroxide water was added into the vessel at a flow rate of about 1.0 l/hr in order to dissolve all of the crude Mo powder. At this time, a temperature of the reaction system was maintained at 40° C. or less. Afterward, water was added thereto in order to bring the total amount to 10 liters.

(2) Second Step

In the first place, an H-type cation exchange resin (trade name, Diaion SK 1; grain diameter: 50 to 100 meshes; produced by Mitsubishi Chemical Industries Co., Ltd.) of strongly acidic polystyrene sulfonic acid was prepared. After 400 g of this cation exchange resin was swelled sufficiently with water, polypropylene columns each having an inner diameter of 35 mm and a length of 400 mm were filled with the swelled cation exchange resin, thereby forming three ion exchange columns. By the use of these three columns, such an apparatus as shown in FIG. 3 was constructed.

In FIG. 3, reference numeral 21 is a sample solution prepared in the first step, and numeral 22 is a pump for forwarding the solution 21. Numerals 23, 24 and 25 all are the above-mentioned ion exchange columns, and numerals 26, 27, 28, 29, 30, 31 and 32 all are three-way cocks for switching flow paths of the sample solution. Numeral 33 is an Mo eluate coming through the ion exchange columns, 35 and 36 are a hydrochloric acid solution and a washing solution for reproducing the cation exchange resin, and 34 is a three-way cock.

First of all, the three-way cocks 26, 27, 28, 29 and 30 were opened to form such a flow path as the sample solution 21 would flow through the iron exchange columns 23 and 24 in turn by the solution-forwarding pump 22 but would not flow through the iron exchange column 25, and afterward, the solution-forwarding pump 22 was operated to run the sample solution 21. At the time when a volume of the run solution 21 had reached 5 liters, the three-way cock 30 was switched and the three-way cocks 31 and 32 were opened to form a flow path comprising the ion exchange columns 23, 24 and 25 through which the sample solution 21 would flow. The sample solution 21 was caused to flow through the given flow path, thereby obtaining the Mo eluate 33.

(3) Third and Fourth Steps

The Mo eluate obtained in the second step was placed in a vessel an inner wall of which is made of a tetrafluoroethylene polymer, and was heated to 150° C. to carry out an evaporation dehydration treatment. The resulting concentrated solid material was heated to 900° C. or higher for reduction in a hydrogen furnace, and 980 g of a powder was obtained, a yield being 97%.

(4) Quantitative analysis of impurities

The powder obtained in the fourth step was quantitatively analyzed to measure contents of elements other than Mo, i.e., impurities. The results are shown in Table 1. For comparison, the results of the quantitative analysis of an Mo powder which was purified in the conventional manner (recrystallization process) are also shown together therein. The unit for the respective values in the table is ppm except for U and Th.

The results of a quantitative analysis are shown in Table 2.

TABLE 2

| Impurity element | Na | K | Mg | Ca | Cu | Mn | Fe | Ni | Cr | Zn | U* | Th* |
|---|---|---|---|---|---|---|---|---|---|---|---|---|
| Analytical result of starting crude Mo powder | 34 | 58 | 12 | 13 | 6.2 | 5.4 | 84 | 18 | 10 | 7.1 | 45 | 15 |
| Analytical result when purified by conventional process | 2.5 | 4.3 | 3.2 | 1.9 | 0.3 | 0.6 | 3.5 | 1.9 | 1.6 | 0.6 | 18 | 3.4 |
| Analytical result in case of this invention | <0.05 | <0.05 | <0.05 | <0.05 | <0.05 | <0.05 | <0.05 | <0.05 | <0.05 | <0.05 | <0.1 | <0.01 |

*Unit of values regarding U and Th is ppb.

EXAMPLE 3

In a vessel an inner wall of which was made of a tetrafluoroethylene polymer was placed 1 kg of a crude tungsten (or molybdenum) powder which was a raw material, and 500 ml of water was further added thereto. Afterward, while cooled by the use of running water and while stirred by a stirrer 3, a pump was operated, whereby 2.3 liters (or 4.6 liters of Mo) of hydrogen peroxide water (30%) and 100 ml of nitric acid were added thereto successively at a flow rate of about 1.0 liter per hour. At a temperature of 40° C. or less, the powder was dissolved therein, and the total volume of the resulting solution was brought to 10 liters, thereby preparing a sample solution.

As a cation exchange resin, Diaion SK 1 (trade name, average grain diameter: 50 to 100 meshes; produced by Mitsubishi Chemical Industries Co., Ltd.) of strongly acidic polystyrene sulfonic acid was employed. After 400 g of this cation exchange resin was sufficiently swelled with water, and polypropylene columns having an inner diameter of 35 mm and a length of 400 mm were filled with the swelled cation exchange resin, thereby forming ion exchange columns. The previously prepared solution was caused to flow through the thus formed ion exchange columns. After an eluate coming through the ion exchange columns was transferred to a

TABLE 1

| Impurity element | Na | K | Mg | Ca | Cu | Mn | Fe | Ni | Cr | Zn | U* | Th* |
|---|---|---|---|---|---|---|---|---|---|---|---|---|
| Analytical result of starting crude Mo powder | 20 | 28 | 7.3 | 18 | 3.2 | 4.3 | 45 | 9.6 | 6.3 | 5.9 | 82 | 11 |
| Analytical result when purified by conventional process | 1.5 | 11 | 2.1 | 3.2 | 0.4 | 0.8 | 28 | 3.7 | 1.2 | 1.1 | 21 | 2.3 |
| Analytical result in case of this invention | <0.05 | <0.05 | <0.05 | <0.05 | <0.05 | <0.05 | <0.05 | <0.05 | <0.05 | <0.05 | <0.1 | <0.1 |

*Unit of values regarding U and Th is ppb.

EXAMPLE 2

According to the procedure of Example 1 with the exception that a W powder containing impurities shown in Table 2 and 2.3 liters of hydrogen peroxide solution were employed, a purified W powder was prepared.

sealed concentration vessel, an electric heater was switched on, and water vapor thereby generated was sucked and exhausted by an aspirator. By a perfect dehydration, tungsten oxide (or molybdenum oxide) was prepared. The resulting tungsten oxide (or molybdenum oxide) was reduced with hydrogen at a temperature of 900° C. by the use of a hydrogen reduction furnace to prepare a tungsten (or molybdenum) powder.

The thus prepared powder was quantitatively analyzed for metallic elements other than tungsten and molybdenum in ordinary manner, and the results are shown in Tables 3 and 4.

(3) Third and Fourth Steps

The same treatments as the third and fourth steps in Example 1 were carried out to obtain 900 g of a desired powder.

TABLE 3

| Impurity element | Na | K | Mg | Ca | Cu | Mn | Fe | Ni | Cr | Zn | U* | Th* |
|---|---|---|---|---|---|---|---|---|---|---|---|---|
| | (ppm) | | | | | | | | | | | |
| Analytical result of starting crude Mo powder | 20 | 28 | 7.3 | 18 | 3.2 | 4.3 | 45 | 9.6 | 6.3 | 5.9 | 82 | 11 |
| Analytical result when purified by conventional process | 1.7 | 8.6 | 1.8 | 3.6 | 0.9 | 0.6 | 17 | 2.8 | 1.1 | 0.7 | 17 | 3.5 |
| Analytical result in case of this invention | <0.05 | <0.05 | <0.05 | <0.05 | <0.05 | <0.05 | <0.05 | <0.05 | <0.05 | <0.05 | <0.1 | <0.1 |

*Unit values regarding U and Th is ppb.

TABLE 4

| Impurity element | Na | K | Mg | Ca | Cu | Mn | Fe | Ni | Cr | Zn | U* | Th* |
|---|---|---|---|---|---|---|---|---|---|---|---|---|
| | (ppm) | | | | | | | | | | | |
| Analytical result of starting crude Mo powder | 34 | 58 | 12 | 13 | 6.2 | 5.4 | 84 | 18 | 10 | 7.1 | 45 | 15 |
| Analytical result when purified by conventional process | 1.9 | 5.2 | 2.1 | 1.4 | 0.5 | 0.4 | 7.9 | 1.2 | 1.0 | 0.4 | 21 | 4.9 |
| Analytical result in case of this invention | <0.05 | <0.05 | <0.05 | <0.05 | <0.05 | <0.05 | <0.05 | <0.05 | <0.05 | <0.05 | <0.1 | <0.1 |

*Unit of values regarding U and Th is ppb.

The results in Tables 3 and 4 indicate that the method of this invention can provide W and Mo having a very high purity.

EXAMPLE 4

(1) First Step

In a vessel an inner wall of which was made of a tetrafluoroethylene polymer was placed 1.2 Kg of tungsten dioxide which had been manufactured from commercially available ammonium paratungstate containing impurities in amounts shown in Table 5, and 1,000 ml of water was then added thereto, followed by stirring. While the vessel was cooled with running water, 2.3 liters of 30% hydrogen peroxide water was added into the vessel at a flow rate of about 58 ml/min in order to dissolve all of the tungsten dioxide powder therein. At this time, a temperature of the reaction system was maintained at 40° C. or less without any temperature control. A decomposition reaction therein took about 1 hours. Afterward, water was added thereto in order to bring the total volume to 10 liters.

(2) Second Step

This step was carried out by employing the same apparatus and procedure as in Example 1.

(4) Quantitative analysis of impurities

The concentrated solid material which had been obtained in the third step was quantitatively analyzed (in terms of a metallic powder) to measure quantitative values of other elements other than the W content, i.e., impurities. The results are shown in Table 1. For comeparison, the results of the quantitative analysis of ammonuim paratungstate which was purified in the conventional manner (a recrystallization process) are also shown together therein. The unit of the respective values in the table is ppb.

TABLE 5

| Impurity element | Analytical result of starting crude WO$_2$ powder (in terms of metallic powder) | Analytical result of ammonium paratungstate when purified by conventional process (in terms of metallic powder) | Analytical result of tungstic acid in case of this invention (in terms of metallic powder) |
|---|---|---|---|
| Na | 10,000 | 1,000 | <500 |
| K | 20,000 | 6,000 | <100 |
| Mg | 5,000 | <5,000 | <20 |
| Ca | 10,000 | 2,000 | <50 |
| Cu | <1,000 | 4,000 | <50 |
| Mn | 1,000 | <10,000 | <50 |
| Fe | 1,000 | 6,000 | 150 |
| Ni | 20,000 | 10,000 | 5 |
| Cr | <10,000 | 1,000 | 50 |

TABLE 5-continued

| Impurity element | Analytical result of starting crude $WO_2$ powder (in terms of metallic powder) | Analytical result of ammonium paratungstate when purified by conventional process (in terms of metallic powder) | Analytical result of tungstic acid in case of this invention (in terms of metallic powder) |
| --- | --- | --- | --- |
| Zn | <5,000 | <5,000 | — |
| U  | 2      | 1      | 0.5 |
| Th | 0.3    | 0.3    | 0.1 |

EXAMPLE 5

In accordance to the same procedure as in Example 4 with the exception that a crude $Mo_4O_{11}$ powder containing impurities shown in Table 6 was used, purified molybdic acid was prepared. The results of its quantitative analysis are shown in Table 6.

TABLE 6

| Impurity element | Analytical result of starting molybdenum lower oxide (in terms of metallic powder) | Analytical result of ammonium molybdate when purified by conventional process (in terms of metallic powder) | Analytical result of molybdic acid in case of this invention (in terms of metallic powder) |
| --- | --- | --- | --- |
| Na | 10,000 | 7,000 | 300 |
| K  | 30,000 | 4,000 | <100 |
| Mg | <5,000 | <5,000 | 100 |
| Ca | 30,000 | 6,000 | <100 |
| Cu | 4,000  | 4,000 | <100 |
| Mn | 15,000 | 10,000 | <100 |
| Fe | 40,000 | 25,000 | 500 |
| Ni | 30,000 | 20,000 | 100 |
| Cr | 15,000 | 8,000 | 300 |
| Zn | <5,000 | <5,000 | <100 |
| U  | 12     | 6     | <0.5 |
| Th | 1.6    | 0.8   | <0.5 |

EXAMPLE 6

As a solution to be treated, an aqueous hydrogen peroxide solution of molybdic acid ($H_2MoO_4$) prepared by the passage through a cation exchange resin was employed. That is, 3 liters of the aqueous hydrogen peroxide solution was placed in a polyethylene vessel which had been heated and washed in nitric acid, and a Teflon (trade name) lid which had likewise been heated and washed in nitric acid was mounted on the vessel. The latter was then received in a domestic microwave oven (output 0.5 kW), and was then heated therein for about 3 hours. Afterward, the solution was stirred with a Teflon (trade name) spatula which had been heated and washed in nitric acid, and the heating operation was stopped just before the resulting precipitate had been dried. While the precipitate was then dried by heat inertia in this state, stirring was carried out to set the whole prepipitate in the state of fine grains. Further, a plastic sieve was employed and the remaining coarse grains on the sieve were then ground, so that an $H_2MoO_4$ having an average grain diameter of about 1 mm or less was obtained.

The thus obtained $H_2MoO_4$ powder was quantitatively determined for impurities shown in the table, and determined values (ppb) are shown in Table 7. In Table 7, quantitative values of impurities in an $H_2MoO_4$ solution which is a starting material are also shown together therein.

COMPARATIVE EXAMPLE

The same aqueous hydrogen peroxide solution of $H_2MoO_4$ as in Example 6 mentioned above was placed in a stainless steel vessel coated with Teflon (trade name), and heating was carried out by a direct flame to form a sludgy precipitate on the bottom of the vessel. Afterward, this precipitate was transferred to an SUS vat coated with Teflon (trade name), and vacuum drying was then carried out at 70° C. for about 18 hours. In succession, the dried mass-like material was ground by a pure Mo (99.9%) slug and plate, so that an $H_2MoO_4$ powder was prepared. For the thus prepared $H_2MoO_4$ powder, quantitative analysis was carried out in the same manner as in the preceding examples to determine impurities therein. The results are shown in Table 7.

TABLE 7

|  | Na | K | Fe | Cr | Ni |
| --- | --- | --- | --- | --- | --- |
| Analytical result of starting solution | 220 | <100 | 70 | <50 | <50 |
| Example 6 | 220 | <100 | 80 | <50 | <50 |
| Comparative example | 800 | 130 | 450 | 320 | 100 |

EXAMPLE 7

In accordance with the same procedure as in Example 6 with the exception that an aqueous hydrogen peroxide solution of tungstic acid ($H_2WO_4$) prepared by the passage through a cation exchange resin was employed as a solution to be treated, a powder was prepared. From the quantitative analysis of impurities, it was found that a high-purity powder could be obtained effectively as in the case of the above-mentioned Mo.

As is apparent from the above given description, the contents of the impurities in the product prepared by this invention ca be reduced to about 1/100 of their contents in products prepared by the conventional process. Further, the apparatus used for the purification is extremely simple, and its method is also simple. Incidentally, when a small amount of a strong acid is added to the reaction system at the decomposition with $H_2O_2$ and when cooling is carried out, a recovery rate of Mo or W will be heightened, a less amount of $H_2O_2$ will be consumed, and the product having a higher purity will be obtained.

In both the cases of the Mo powder and the W powder purified in accordance with this invention, an amount of radioactive elements is less than 0.1 ppb, and an amount of alkali metals and heavy metals are less 0.05 ppm. As understood from these facts, the Mo and W powders prepared by this invention are of an extremely high purity, and it thus is fair to say that they are useful as materials for targets of VLSI elements.

We claim:

1. A method for preparing a molybdenum or tungsten powder which comprises:
    a first step of dissolving a first powder comprised of (a) molybdenum, an oxide of molybdenum, tungsten or an oxide of tungsten and (b) impurities in water that contains an acid and hydrogen peroxide such that the resulting aqueous solution has an acid concentration of 0.4N of less and said hydrogen peroxide is present in a concentration ranging between about 5% and 35% by weight;
    a second step of bringing said aqueous solution, which comprises molybdenum or tungsten anion in the 7+ oxidation state, into contact with an H type cation exchange resin, such that impurities present as cations in said aqueous solution are adsorbed by said resin but molybdenum or tungsten anion in said aqueous solution pass through said resin, said impurities comprising at least one from the group consisting of Na, K, Mg, Ca, Cu, Mn, Fe, Ni, Cr, Zn, U, and Th;

a third step of concentrating said aqueous solution to produce a second powder; and a fourth step of heating said second powder in the presence of hydrogen to produce a concentrated solid material consisting essentially of molybdenum or tungsten.

2. A method for preparing a molybdenum or tungsten powder according to claim 1, wherein said first powder of molybdenum or tungsten has a grain diameter of 1 to 100 μm.

3. A method for preparing a molybdenum or tungsten powder according to claim 2, wherein said first powder has a grain diameter of 1 to 10 μm.

4. A method for preparing a molybdenum or tungsten powder according to claim 1, wherein said acid is selected from the group consisting of hydrochloric acid and nitric acid.

5. A method for preparing a molybdenum or tungsten powder according to claim 1, wherein said first step comprises cooling said water.

6. A method for preparing a molybdenum or tungsten powder according to claim 5, wherein said first step is carried out at a temperature within the range of 10° to 40° C.

7. A method for preparing a molybdenum or tungsten powder according to claim 1, wherein said concentration treatment in said third step is carried out by the use of microwave irradiation of said aqueous solution.

8. A method for preparing a molybdenum oxide or tungsten oxide powder which comprises:

a first step of decomposing a first powder comprised of molybdenum, an oxide of molybdenum, tungsten or an oxide of tungsten with water that contains an acid and hydrogen peroxide such that the resulting aqueous solution has an acid concentration of 0.4N or less and said hydrogen peroxide is present in a concentration ranging between about 5% and 35% by weight;

a second step of bringing said aqueous solution, which comprises molybdenum or tungsten anion in the 7+ oxidation state, into contact into contact with an H type cation exchange resin, such that impurities present as cations in said aqueous solution are adsorbed by said resin but molybdenum or tungsten anion in said aqueous solution pass through said resin, said impurities comprising at least one from the group consisting of Na, K and Mg; and a third step of concentrating said aqueous solution to produce a second powder which consists essentially of molybdenum oxide or tungsten oxide.

9. A method for preparing a molybdenum oxide or tungsten oxide powder according to claim 8, wherein said first powder has a grain diameter of 1 to 100 μm.

10. A method for preparing a molybdenum oxide or tungsten oxide powder according to claim 8, wherein said first powder has a grain diameter of 1 to 10 μm.

11. A method for preparing a molybdenum oxide or tungsten oxide powder according to claim 8, wherein said acid is selected from the group consisting of hydrochloric acid and nitric acid.

12. A method for preparing a molybdenum oxide or tungsten oxide powder according to claim 8, wherein said first step comprises cooling said water.

13. A method for preparing a molybdenum oxide or tungsten oxide powder according to claim 12, wherein said first step is carried out at a temperature within the range of 10° to 40° C.

14. A method for preparing a molybdenum oxide or tungsten oxide powder according to claim 8, wherein said concentration treatment in said third step is carried out by the use of microwave irradiation of said aqueous solution.

15. A method for preparing a molybdenum or tungsten powder according to claim 1, wherein said third step comprises heating said aqueous solution under reduced pressure.

16. A method for preparing a molybdenum or tungsten powder according to claim 15, wherein said aqueous solution is heated at a temperature of about 60° to 100° C. under a pressure range between about 10 and 50 mm Hg.

17. A method for preparing a molybdenum or tungsten powder accoding to claim 1, wherein said concentrated solid material is substantially pure molybdenum or tungsten.

18. A method for preparing a molybdenum or tungsten powder accoding to claim 8, wherein said third step comprises heating said aqueous solution under reduced pressure.

19. A method for preparing a molybdenum or tungsten powder accoding to claim 18, wherein said aqueous solution is heated at a temperature of about 60° to 100° C. under a pressure range between about 10 and 50 mm Hg.

20. A method for preparing a molybdenum oxide of tungsten oxide powder according to claim 8, wherein said second powder is substantially pure molybdenum oxide of tungsten oxide.

21. A method for preparing a molybdenum or tungsten powder according to claim 1, wherein said impurities comprise at least one from the group consisting of Na, K, and Mg.

22. A method for preparing a molybdenum or tungsten powder according to claim 2, wherein said first powder of molybdenum or tungsten has a grain diameter or 1 to 30 μm.

* * * * *